United States Patent [19]

Halamka

[11] Patent Number: 4,951,203

[45] Date of Patent: Aug. 21, 1990

[54] COMPUTER CARD

[76] Inventor: John D. Halamka, 1100 Bayhills Dr., San Rafael, Calif. 94903

[21] Appl. No.: 200,234

[22] Filed: May 31, 1988

Related U.S. Application Data

[62] Division of Ser. No. 649,995, Sep. 13, 1984.

[51] Int. Cl.[5] .............................................. G06F 15/38

[52] U.S. Cl. .................................................... 364/419

[58] Field of Search ................ 364/419; 434/307, 309; 360/72.1, 72.2

[56] References Cited

U.S. PATENT DOCUMENTS 4,712,180 12/1987 Fujiyama et al. ................... 364/419

*Primary Examiner*—Leo P. Picard
*Assistant Examiner*—Lincoln Donovan
*Attorney, Agent, or Firm*—John E. Halamka

[57] ABSTRACT

In combination with a digital computing machine the computer card is formatted by the user to include an audio portion and a visual portion of an interpersonal-social communication. The composite communication is transmitted by the user to a recipient through a computerized central mail exchange apparatus or created on removable, transportable magnetic media, such as a floppy disk, insertable into and readable by the recipient's audio and visual display device whereby a synchronized audio and visual display of the interpersonal-social communication is created.

11 Claims, 3 Drawing Sheets

COMPUTER CARD

This application is a division application of Ser. No. 06/649,995 filed 09/13/84 by the same inventor

BACKGROUND OF THE INVENTION

1. Field of the Invention

This invention relates generally to electronic communication by means of a digitally controlled computer and, more particularly, to data processing methodology and apparatus for effecting an improved interpersonal-social communication system.

2. Description of the Prior Art

Interpersonal-social greeting cards have required the user to select from a plurality of messages printed in a fixed media on a paper based card combined with a visual still picture and design. While pleasing to the eye, the message and picture are static and both ignore the sense of hearing.

Some greeting cards have expanded to a multimedia presentation by adding an integrated circuit to the card format so that when the card is opened, an on/off switch mounted on the card is turned on to activate the integrated circuit to generate a musical selection to accompany the recipients review of the paper card's printed message, picture and design.

Other greeting cards have an integrated circuit capable of speech synthesis. the integrated circuit provides for an external read only memory (ROM) to increase the vocabulary of the integrated circuit speech synthesis driver. the integrated circuit can be attached to a paper greeting card to provide a "spoken word message" to accompany the printed message, picture and design of the card.

When using the musical generation card, the musical selection is fixed by the prespecified mask used in the fabrication of the integrated circuit. The effort to create a new musical selection includes the creation of a new mask to manufacture another integrated circuit. The procedure of creating a mask is arduous, time consuming and prone to error. Errors are difficult to locate and any error that is recognized after th mask has been used to create the integrated circuit usually renders the integrated circuit unusable.

The basic speech synthesis card has a limited vocabulary and thus can only produce a limited number of spoken messages.

With the addition of external ROM, the vocabulary is increased to produce a much larger number of spoken messages. However, the rom is still an integrated circuit with all of the limitations of flexibility, cost and manufacturing problems discussed above.

There has long been a need for a multimedia versatile interpersonal-social communication system that can be produced with relative ease, is amenable to correction by simple editing and has the capability of containing a wide selection.

SUMMARY OF THE INVENTION

Accordingly, it is the object of the present invention to provide a multimedia greeting card which can be produced and used with relative ease.

It is yet another object of the present invention to provide an array of selections and combinations of visual messages and audio accompaniment ready made for the user.

It is yet another object to only require the recipient to have access to a basic computer system without special purpose equipment in order to exercise the basic multimedia message contained on the greeting card. the sender, at the time of purchase of the computer greeting card, can select from a plurality of messages, designs and musical renditions that are ready to send to the recipient without any requirement for the sender to edit the card by electronic means.

It is another object of the present invention to provide the distinct advantage that the invention can accept correction of errors through a simple editing procedure to change the spelling of any word in the message, the placement of any line in the designer the parameters of any note in the musical accompaniment to the visual display.

It is yet another object of the present invention to allow the user to create and insert the user's own prespecified visual message to be read by the recipient by following an easy procedure known to users of computer equipment.

Yet another object of the present invention is to exercise any special purpose equipment interfaced with the basic computer system of the user. this equipment can include a speech synthesizer, a color graphics display, and a modem to connect the computer with a network.

BRIEF DESCRIPTION OF THE DRAWING

The above and other embodiments of the present invention may be more fully understood from the following detailed description, taken together with the accompanying drawing wherein similar referenced characters refer to similar elements throughout and in which.

DETAILED DESCRIPTION

Figure 1:
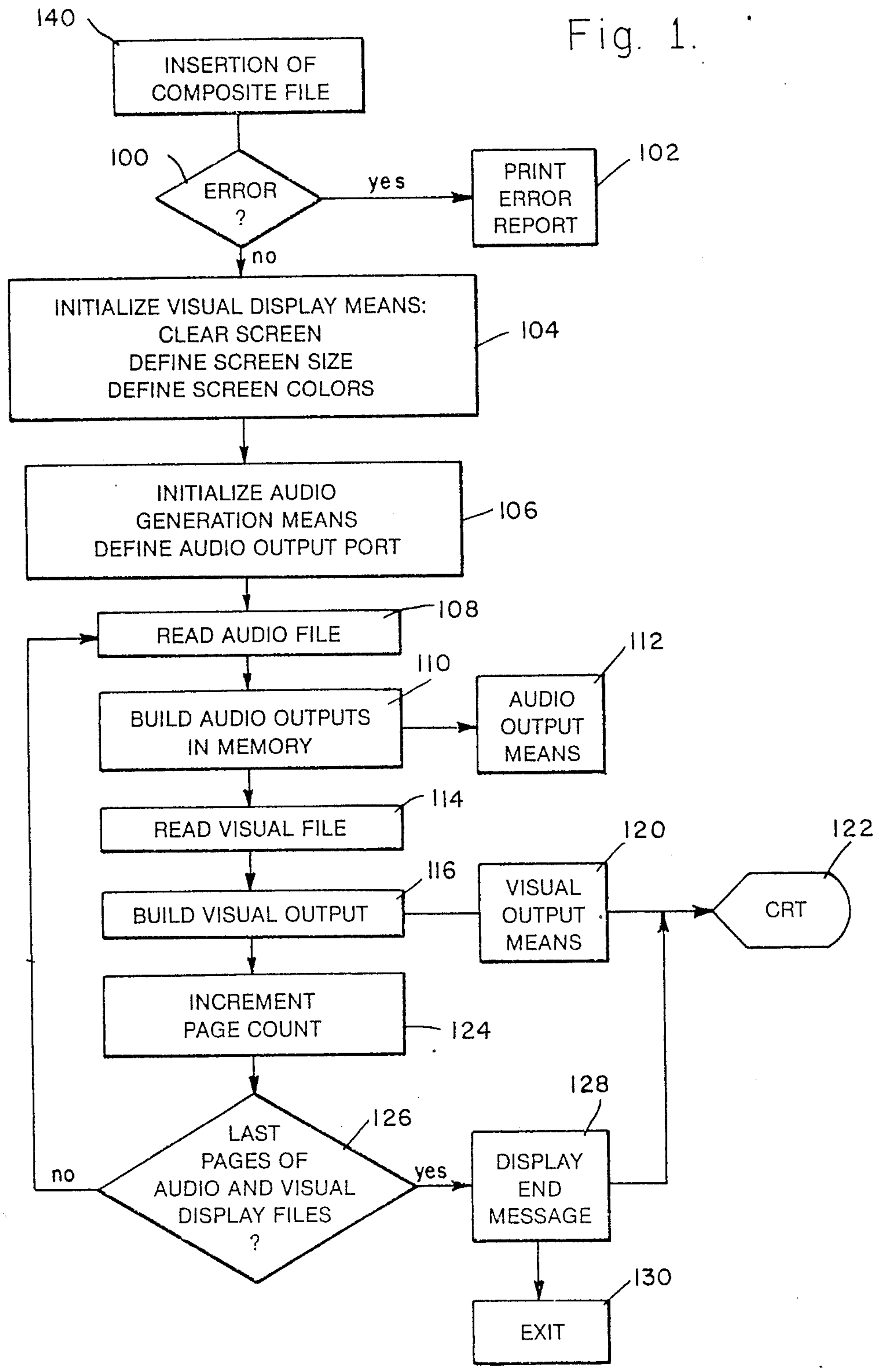
FIG. 1 is a schematic flow chart depicting the data processing methodology and structure in accordance with the principles of the present invention for a system for processing and supervising a composite interpersonal-social communication.

Referring now to FIG. 1, there is shown in overall scope a data processing and system operational flow chart for implementing a system for processing and supervising an interpersonal-social communication system incorporating the principles of the present invention. As contemplated by the present invention, there are two fundamental types of output generated in each communication. The first is visual and the second is audio. At the kernel of the overall system is a control system that defines the environment in which the communication is generated.

Some systems are self contained and are made up of a cathode ray tube (CRT) upon which a visual message may be displayed and an audio generator which can be directed to produce tones. This self contained system is the basic system necessary to exercise this invention.

One of the most popular basic systems available to a user of the present invention is the "IBM" "PC" personal computer. The basic system has a monochromatic visual display and a pure tone generator.

Each tone to be generated can be characterized by a definition of the frequency of the tone and the duration. the tone thus generated is a pure tone, without modulation and without control of volume. By selecting steps in the tones to be generated, the user can create sound effects such as a bouncing ball, a siren, an alarm, etc.

However, only one tone can be produced at a time, therefore any n \ musical selection created by the system will consist of a single melody without cords.

The "IBM" system supports a "BASIC" language which contains commands to control the generation of tones. One such command is "SOUND". However, when this command is utilized, the system will dedicate the entire resources of the system to the generation of the tone. If the command "PLAY" is utilized to provide the information to characterize the tone generation, the system will read data statements containing the information, store a plurality of characterizations in memory for execution by the tone generation output while allowing the central processing unit to perform other functions such as generation of a visual display.

The visual displays created to accompany the audio selection may be constructed to contain rotating asterisk marks, a border of asterisk marks. a border of lines, etc. within which is a word message. The word message may be composed of many pages of text. Each page may be displayed upon the CRT for a preselected length of time so that the page is accompanied by a preselected number of measures of generated tones. The generated tones may be composed by the originator of the interpersonal-social communication or may be selected to duplicate a popular tune.

The essential function is to synchronize the generation of the visual display with the generation of the audio display.

Referring to FIG. 1, the system must enter the operating system with a directive to read from the magnetic media of the system. Most personal computers utilize the floppy disk form of magnetic media as a source for initial system definition. When the poser is turned on and a floppy disk inserted into the means to read the magnetic media, the control of the system is dictated by the files on the magnetic media. The present invention provides a control file to configure the digital computing machine. Initial error checking is done at functional block 1200 with any non-recoverable error resulting in a printed error message produced by functional block 102.

If no errors are detected above, the visual display means is initialized by functional block 104. The type of visual display is defined. The display can be a monochromatic monitor that produces only one color such as green or orange. The display can be a color monitor which will allow the user to create a more pleasing visual display. If the display is a graphics monitor, the designs which the user can create can become intricate with even more impact upon the recipient of the interpersonal-social communication The audio generation means is initialized by functional block 106. For the basic system comprised of an "IBM" "PC" as described above, the pure tone generator is incorporated as a standard, addressable output means of the system. Additional audio generation means may be interfaced with the basic system. A speech synthesizer may be driven by a special interface board plugged into a "mother board" of the system. Some speech synthesizers can interface with the system through a serial or parallel output port.

If the system is expanded to include a speech synthesizer, the audio output can be comprised of only speech or may generate speech to accompany the pure tone generator and visual display generator functions.

Yet another type of audio generator in the form of a variable tone generator can be interfaced with the basic digital computing machine. This type of audio generation device can create a plurality of mixed frequencies. The frequencies can be selected to create the composite tones generated by such musical instruments such as a piano, organ, flute, etc. Some variable tone generators allow the generation of cords.

The audio file processing preferred embodiment uses the BASIC language facility of the digital computing machine to process a plurality of audio output characterizations so that output file may be built and subsequently output without further intervention of the central processing unit (CPU). Without this capability, the single audio output characterization processing and output will be interrupted by the visual output characterization processing causing a silent gap in the audio output.

The present invention utilizes this BASIC language facility to create a plurality of audio output characterizations of a preselected number, from more than one to 255, sufficient to allow subsequent processing of the visual output characterizations and return to audio output characterizations for creation of audio output files before the execution of output of the previous audio file is complete. This avoids any silent gap in the audio output.

FIG. 1 shows that the first page of the audio file is read by the functional block 108. The central processing unit, CPU, of the digital computing machine assembles the audio display in the memory by functional block 110 and allows the audio output means in functional block 112 to execute the audio output file from memory.

Control is then given to the CPU in functional block 114 to read the first page of the message file. The CPU assembles the visual display at functional block 118 and commands the visual output means of functional block 120 to create the display on the CRT (functional block 122).

The visual and audio message page count is incremented at functional block 124. Functional block 126 checks to determine if the last pages have been executed. If not, the CPU is directed to return to the reading of audio and visual files for the next page of commands. If the last page has been executed, the end messages are generated and displayed on the CRT by functional block 128 and control is returned to the operating system by functional block 130.

Whatever type of audio generator is selected, the important function of this invention is the synchronization of the output of the visual and audio generations. Control of the audio generator by the processing and supervising system 200, shown in FIG. 2, or the digital computing machine, shown in FIG. 1, must include means to process a plurality of audio generation characterizations so that the control is not invoked for each and every characterization. Without these means, the control of audio generation will be interrupted by the control for the visual generation. Such an interruption will cause gaps of silence in the audio generation that can be perceived by the user if the gaps are longer than 0.01 seconds.

Figure 2:
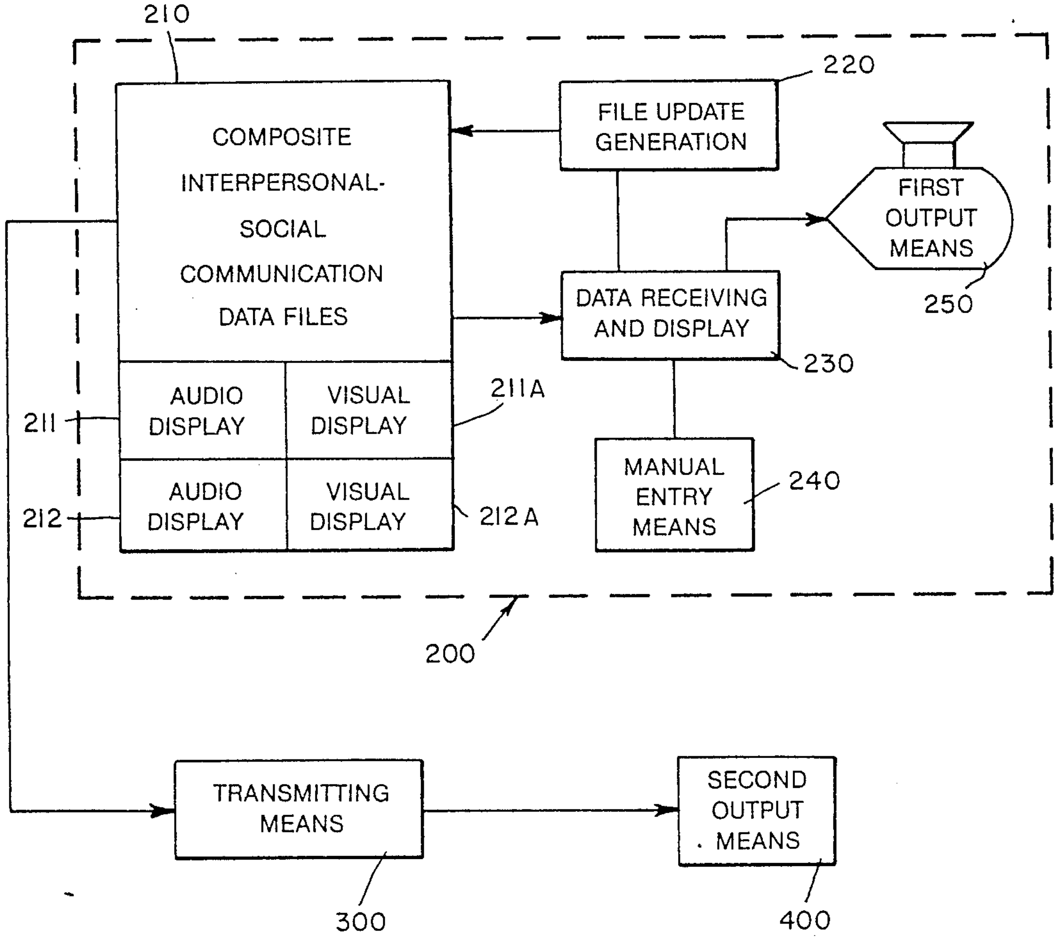
FIG. 2 is a block diagram of the processing and supervising system shown interfaced with the second output means via the transmitting means.

In the present invention shown in FIG. 2, a group of up to 255 audio characterizations from the audio display 211 data file of the composite interpersonal-social communication 210 can be placed in data receiving and display 230 which may utilize the central memory of the processing and supervising system 200. The output of the group of characterizations can be placed under the control of the output supervisor whereby each characterization will be output at the time interval indicated in the characterization without further intervention of the CPU of the processing and supervising system 200. The processing and supervising system 200 may now utilize the CPU to read the visual display 212, format the display, and request output of the formatted visual display to the first output means 250 without causing silent gaps in the output of the audio display generation by the first output means 250.

Manual entry means 240 such as a keyboard, mouse or the like may be utilized by the user to create an input stream of new or updated audio of visual display characterizations which are recognized by data receiving and display 230. The characterizations may be displayed on the first output means 250 on a cathode ray tube CRT display device, a printer or the like. The form and content of the characterizations may be verified and any corrections or additions entered by the user. The user may then request the file update generation 220 to operate upon the characterizations contained in date receiving and display 230 to create a new or updated audio display 211 or visual display 212 that comprise the composite interpersonal-social communication data file 210.

After generation or update of the data files, the user may request a plurality of composite interpersonal-social communication data files 210 to be sent via transmitting means 300 to a second output means 400.

Figure 3:
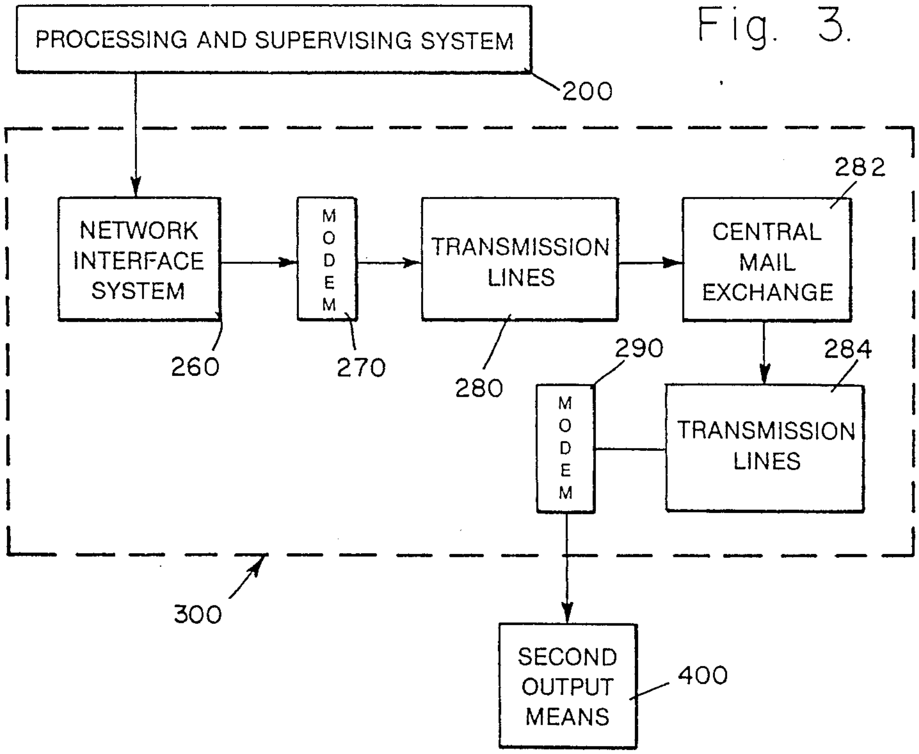
FIG. 3 is a block diagram of the components of a transmitting means embodiment.

One configuration of the transmitting means 300 is shown in FIG. 3. The processing and supervising system 200 will provide data files 210 to a network interface system 260 which is resident in or accessible by the CPU. Many such network interface system 260 processing devices are available off the shelf and are well known in the art. The only provision for their use is that the output format of the processing and supervising system 200 must be compatible with the network interface system 260.

The network interface system 260 will provide the data to a modem 270 via a parallel or serial output port. The modem 270 will establish contact with the central mail exchange 282 via transmission lines 280 such as a telephone line. The function of a modem 270 is well known in the art. The central mail exchange 282 must have a file allocated to the recipient and the file must be accessible by the user. The user must precede the transmission of the data file 210 with the address of the recipient and any other information or procedure required by the central mail exchange 282. The function, format and use of a central mail exchange 282 is well known in the art. The recipient will have access to the data file 210 upon interrogation of the central mail exchange 282. The recipient must use a second output means 400 to receive and display the composite interpersonal-social communication data file 210.

A basic, preferred transmission means 300 is to output the composite data file 210 onto magnetic media such as a floppy disk. The floppy disk is sent by the user to the recipient. The recipient must have a second output means 400 to process and display the composite interpersonal-social communication data file 210.

Figure 4:
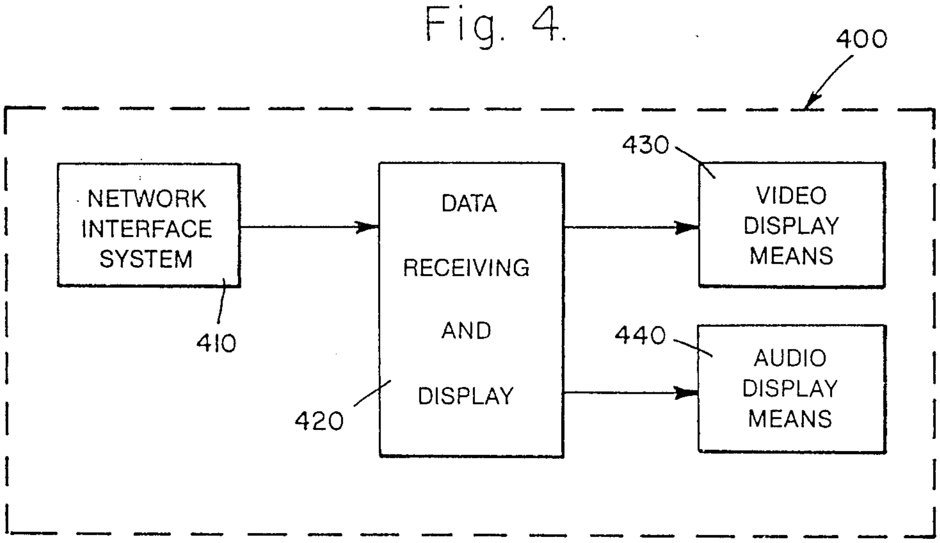
FIG. 4 is a block diagram of the components of a second output means embodiment.

FIG. 4 shows an embodiment for the second output means 400 depicted in FIG. 3 which received data from the modem 290. The data file is received by the network interface system 410 which must be compatible with the data format and processing procedures of the central mail exchange 282. The data file is forwarded by the network interface system 410 to the data receiving and display 420. The data receiving and display 420 must have the same capabilities of the digital computing machine processing described in FIG. 1 to create outputs compatible with the video display means 430 and audio display means 440 utilized by the second display means 400. If these means, 430 and 440, are similar to the users data receiving and display 230 processing the data file can be processed without any necessity for an interrupter.

The basic, preferred transmission means 300 of a floppy disk simplifies the above compatibility and interrupter requirements as the floppy disk transports the operating system from the user to the recipient to provide an automatic processing and supervising system 200 resident on the floppy disk to process and display the composite interpersonal-social communication data file 210 upon insertion of the floppy disk into the second output means is of the type compatible with the user's system.

Since certain change may be made in the above apparatus without departing from the scope of the invention herein involved, it is intended that all matter contained in the above description, as shown in the accompanying drawing, shall be interpreted in an illustrative, and not a limiting sense.

What is claimed is:

1. A computer greeting card created and readable by a digital computing machine comprising:

a simple magnetic media means for storing (2) a plurality of messages a plurality of audio selections and (3) a control file to configure the digital computing machine to present said messages and said audio selections selected by the user in synchronization;

the digital computing machine having an operating system, a visual display means, audio generation means and means to read said magnetic media means;

said control file configured to be read by the digital computing machine from said magnetic media means upon initial operation of the machine, whereby the operating system of said digital computing machine directs the reading of said user preselected message and the output of said message on said display means and directs the reading of said audio selection and the output of said audio selection through said audio generation means synchronously with said output of said preselected message.

2. A computer greeting card as described in claim 1 wherein:

said magnetic media means comprises a floppy disk.

3. A computer greeting card as described in claim 1 wherein:

said user preselected musical selection comprises the setting of the frequency and duration of a plurality of tones to be generated by said audio tone generation means.

4. A computer greeting card as described in claim 1 wherein:

said initial operation of said machine comprises the process of applying power to the digital computing machine and inserting said magnetic media into said means to read said magnetic media.

5. A computer greeting card as described in claim 1 wherein:

said initial operation of said machine comprises the process of inserting said magnetic media into said means to read said magnetic media and causing said machine to cycle through the reset mode.

6. A computer greeting card as described in claim 1 wherein:

said audio generation means comprises a pure tone generator.

7. A computer greeting card as described in claim 1 wherein:

said audio generation means comprises a speech synthesizer.

8. A computer greeting card as described in claim 1 wherein:

said audio generation means comprises a variable tone generator.

9. A computer greeting card as described in claim 1 wherein:

said visual display means comprises a monochromatic monitor.

10. A computer greeting card as described in claim 1 wherein:

said visual display means comprises a color monitor.

11. A computer greeting card as described in claim 1 wherein:

said visual display means comprises a graphics monitor.

* * * * *